Aug. 26, 1952     P. AUGUST     2,608,395
MIXING MACHINE
Filed Aug. 3, 1950
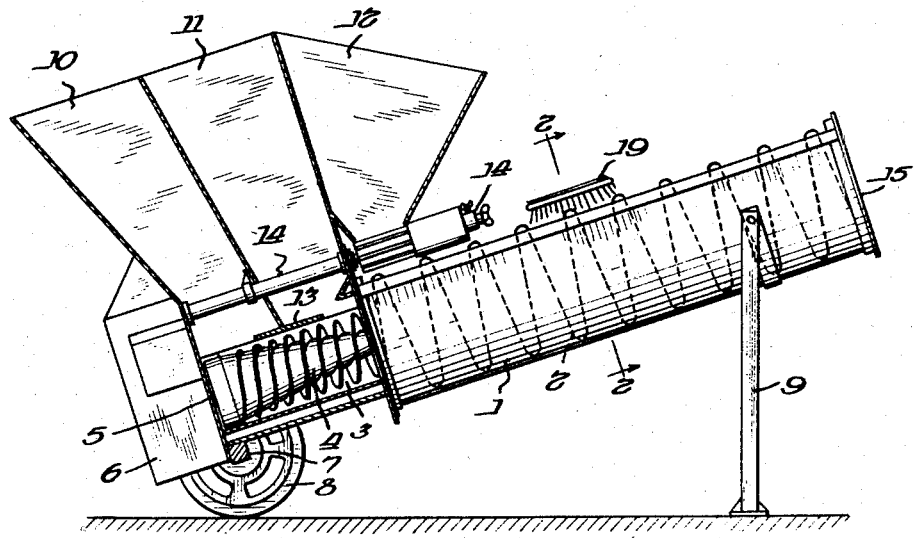
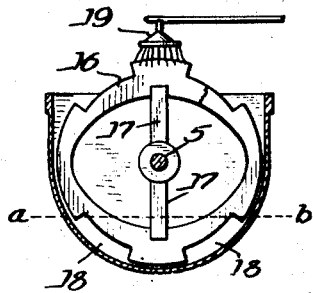 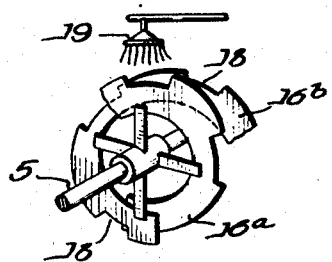
Inventor.
Paul August.

Patented Aug. 26, 1952

2,608,395

UNITED STATES PATENT OFFICE 2,608,395

MIXING MACHINE

Paul August, Hannover, Germany

Application August 3, 1950, Serial No. 177,509
In Switzerland March 31, 1950

11 Claims. (Cl. 259—161)

This invention provides an improved mixing machine, in particular a concrete mixer, which is simple to manipulate and has a high capacity with low power consumption.

A mixer in accordance with the invention is characterized by a horizontally-inclined mixing trough of substantially semicircular cross-section containing a mixing screw or worm for continuously conveying the material to be mixed from the zone of introduction at the lower end of the trough to a discharge opening situated at its upper end.

Preferably the mixing screw or worm, which acts simultaneously as a mixing and as conveying device, is in the form of an internally open sheet-metal helical blade connected by spokes to a shaft in such manner that the resulting openings between the spokes enable a part of the material being mixed always to fall back on the preceding turn or helix, and the outer edge of the helical blade is provided at periodically-recurring angular intervals with cut out portions or slots through which similarly the material being mixed can partially slip or tumble back on to the preceding turn or helix.

A mixer in accordance with the invention can always be conveniently charged at the bottom end by means of baskets or shovels and thus does not require for the introduction of the material to be mixed, either a conveyor band or a hoist. It likewise conveys the material during the mixing process without additional aids to a sufficient height to enable the finished mix to be delivered from the discharge end directly into trucks or directly into a pouring hopper or feeder.

Only a single shaft, in particular the shaft of the combined conveying and mixing screw or worm, requires to be operated, enabling couplings and gears to be eliminated and a motor or prime mover of lesser power to be used. Owing to the form of the worm or screw, which may be further improved by making the inner cut-out holes of approximately elliptical form and/or separating two or more of its turns by radial slots, i. e. completely interrupting the helix at certain points, it is assured that if the material to be mixed contains coarser particles (gravel) no blocking or stoppages will occur, which would increase the power consumption or interrupt the operation of the machine entirely.

A further advantageous feature of the mixing machine according to the invention is its continuous operation which is obtained in a particularly simple manner and which necessitates the provision of a continuous supply of the materials to be mixed at the bottom or feeding end of the machine. For this purpose the mixing trough is preferably provided with a preliminary mixing chamber at the lower end into which the component materials of the required mixture, e. g., sand and gravel, are delivered from separate bins through appropriate feeder devices, for instance of vane or paddle type, the said chamber being provided with a conveyor screw or worm by which the continuously admitted material components are together delivered to the mixing trough. These auxiliary elements may also be operated by the previously mentioned continuous shaft which operates the conveying and mixing screws.

The conveyor screw in the preliminary mixing chamber may be placed directly on the shaft and acts as a feeder disposed within the cylindrical casing which receives material components directly from the discharge outlets of the individual bins or hoppers.

The proportions of the mixture can then be regulated by suitably movably arranged partition means between the respective bin and the outlets thereof.

The direct use of the conveyor screw in the preliminary mixing chamber as a feeder obviously implies that the turns of the screw will be completely filled with material under each bin outlet. Then, for instance, material from the second bin in the series can only enter the screw if the particular turn of such screw has a larger capacity than the turn situated under the first or preceding bin, from which it has just been filled. For this purpose, consequently, the volume enclosed in the turns of the conveyor screw must increase in the direction of travel of the material, which can be effected in particular by increasing the pitch of the screw or the depth of the blade or turns, or by a combination of these two methods.

Such a mixer conveys and mixes the materials supplied to the bins with the lowest possible power consumption in a continuous operation, and therefore presents in addition to the advantageous features enumerated earlier, a mixing performance or capacity equalling that of three to five times heavier, mixers of hitherto known and usual types, which are correspondingly more expensive regarding their initial and operating costs. It can be built of such small weight and dimensions, even for an output corresponding to that of a large mixer, that it may, for instance be towed by a small, passenger car and therefore used, for instance in road and highway construction, at points where heavy concrete mixers of usual type and equivalent output, could not or could only be employed with difficulties.

This is of particular value for concrete mixers and for road work.

The invention will be better understood from the following description in conjunction with the attached drawing which shows one embodiment and a modification by way of example.

Fig. 1 is a part sectional elevation of the illustrated embodiment.

Fig. 2 represents a cross-section through the mixing trough along the line 2—2 of Fig. 1.

Fig. 3 represents a mixing and conveyor screw of modified form.

The machine shown in Fig. 1 comprises a mixing trough 1 accommodating a screw or worm 2 indicated by the broken line and having connected with it a preliminary mixing chamber 3 containing a feeder and conveyor screw 4. The two screws 2 and 4 are suitably mounted on a common, continuous shaft 5 driven by suitable gearing from a motor (not shown) in a casing 6. The entire mechanism is supported at one end on the axle 7 of an undercarriage 8 and at the other end by a folding strut 9 hinged to the mixing trough 1.

Above the preliminary mixing chamber 3 are arranged bins or hoppers 10 and 11, the upper openings of which are placed sufficiently low to permit easy insertion into the bins of the materials to be mixed, e. g., sand and gravel, directly by means of shovels or baskets or the like. The two bins 10 and 11 open underneath directly into the cylindrical casing of the feeder-conveyor screw 4, being separated by a partition at the lower end of which is a slide or shutter 13 which, according to its position and effective width, covers one or more turns of the screw 4. Fig. 1 also shows a hopper 12 at the discharge end of which a rotating feeder device is provided with its axis parallel to the main shaft 5 and consisting in any known manner of vanes, paddles or blades which at each revolution allow a determined quantity of a particular component, e. g. cement, to be introduced directly into the underlying mixing trough 1.

The screw 4 is made with constant pitch but with increasing depth of blade in such manner that the volume enclosed by the respective turns increases continuously from left to right. The illustrated screw has eight turns and it is assumed that the volume enclosed by each turn, increases by one eighth successively. If the shutter 13 is placed in the position shown in Fig. 1, allowing only the first two turns of the screw to be filled from the bin 10, these will accordingly be completely filled with the material delivered by this bin 10 and will contain in all $\frac{2}{8}=\frac{1}{4}$ of the final volume of the screw 4. For the bin 11, the shutter 13 exposes only the last two turns of the screw 4, which already contain the material delivered from the bin 10 into the first two turns of the screw and are filled up under bin 11. Thus, exactly ¾ of the available, total volume will be filled with material from the hopper 11, and the components from bins 10 and 11 are thus present in the mixture in the proportion of 1:3. In a corresponding manner, any other, required mixing ratio can be obtained by exchanging or moving the slide or shutter 13.

The form of the screw 4 will also be found advantageous if the bins 10 and 11 are provided with feeders similar to that shown under the bin 12 and operated by the shaft 14, since in that case also, it is necessary for the volume conveyed by the screw 4 to increase progressively in accordance with the successively-delivered quantities of the mixture components, in order to prevent blocking or stoppage at any point.

From the preliminary mixing chamber 3 the material components accurately proportioned in the manner indicated are continuously delivered by the screw 4 upwards into the inclined mixing trough 1 and there received by the mixing screw 2 and continuously transported further towards the discharge opening 15. In order to obtain a suitable mixing effect during this conveyance of the material, this screw 2 has as shown in Fig. 2, a helically-wound strip or band 16 carried on spokes 17 and provided with cut out slots 18 whereby a portion of the material being conveyed is repeatedly caused to fall or tumble back on to the preceding turn of the screw. Furthermore, the material similarly falls repeatedly through the openings in the interior of the screw back on to the preceding turns of the screw, the mixing trough being filled with material during operation of the machine, approximately to the level $a$—$b$. This tumbling back of the material, to intensify the mixing action of the device, may be further aided and the effect enhanced, by giving the internal openings of the screw an approximately elliptical form thus producing a blade of periodically changing width. The wider portions of the screw blade will propel the material forward, while the narrower portions will let it pass through. The slots 18 are suitably made in the wider portions of the blade in such manner that at these points the screw propels the material at the top, and passes it at the bottom; while in the narrower portions the material is conveyed forward at the bottom and allowed to fall back at the top. It is obvious, that this arrangement ensures an exceptionally good mixing effect.

As already mentioned, a further improvement of the mixing action may be obtained by substituting for the screw blade a number of consecutive blade sections, separated by slits and suitably overlapping. Fig. 3 shows two such overlapping blades. It will be seen that the forward screw blade 16a partially overlaps the rearward screw blade 16b by about 30°. Consequently, the flow of the material in the mixing trough will be interrupted at this point and a part thereof again forced back into the preceding turn of the screw, after which it is again conveyed forward to the point of division between the two blades.

An essential feature of the resulting mixing is, that the mixing is effected not by "kneading" but by simple stirring of the material being mixed, in different planes. Consequently, the mixing is particularly suitable for concrete since even large stones or pebbles contained in the materials cannot give rise to stoppages.

In order to prevent the water necessarily required in the production of concrete, from impeding the proper feeding of the separate components into the preliminary mixing chamber, it is advisable to add this water in the mixing trough. This purpose is served by a spray 19, shown in all the figures and preferably arranged to be movable in the direction of the arrow (Fig. 1) along the mixing trough 1 in order that the degree of pre-mixing at which the water is added, may be selected at will and the optimum instantaneous grain distribution of the component materials, obtained. This is in many cases important for the quality of the final product (concrete).

What I claim is:

1. A mixing machine of the class described comprising a horizontally inclined mixing trough, a rotatable shaft in said mixing trough, spokes on said shaft, a helical interiorly open peripherally substantially circular mixing blade of periodically changing width carried by said spokes, angularly spaced slots formed at the outer edge of said blade, means for feeding material components to the lower end of said mixing trough, and means for rotating said shaft to rotate said blade for conveying said material components along said mixing trough and for mixing such components incident thereto for discharge thereof at the upper end of said trough.

2. A mixing machine of the class described comprising a horizontally inclined cross-sectionally substantially semi-circular mixing trough, a motor-driven shaft carrying a mixing screw disposed in said trough, said mixing screw having a helical peripherally extending interiorly open blade, spokes for securing said blade on said shaft, periodically recurring angularly spaced slots being formed at the outer edge of said blade, the interiorly open space of said blade being of substantially elliptical form, and means for continuously feeding proportionated weights of material components to the lower end of said mixing trough for conveyance thereof by the blade of said mixing screw for discharge from said trough at the upper end thereof.

3. The structure as defined in claim 2, wherein the periodically recurring angularly spaced slots in the outer edge of said blade are disposed on the wider parts thereof.

4. A mixing machine of the class described, comprising a horizontally inclined mixing trough, a rotatable shaft in said mixing trough, spokes on said shaft, a plurality of interiorly open peripherally substantially circular blades carried on said shaft forming a generally helical screw, said blades forming angularly overlapping sections of said screw, angularly spaced slots provided in the outer edges of said blades, means for feeding material components to the lower end of said screw, and means for rotating said shaft to rotate said screw for conveying said material components along said mixing trough and for mixing such components incident thereto for discharge thereof at the upper end of said trough.

5. A mixing machine of the class described comprising means forming a preliminary mixing chamber and a horizontally inclined mixing trough extending from said chamber, a rotatable shaft extending serially through said chamber and through said trough, a feed screw on said shaft in said preliminary mixing chamber to form therein a conveyor means, spokes on said shaft in said trough, blade means of periodically changing width carried on said spokes forming in said trough a generally helically extending interiorly open peripherally generally circular mixing screw, peripheral portions of said blade means being cut away to form recesses at the outer edge thereof which extend radially inwardly, means for feeding material components to said preliminary mixing chamber, and means for rotating said shaft to rotate said conveyor means for feeding material from said preliminary mixing chamber to the lower end of said mixing trough for conveyance thereof by said mixing screw along said mixing trough and for the mixing of such components and discharge thereof at the upper end of said trough.

6. The structure as defined in claim 5, together with hopper means constituting the means for feeding material components to said preliminary mixing chamber, and means for adjusting the amounts of material which are being fed to predetermined portions of said feed screw in said preliminary mixing chamber.

7. A mixing machine of the class described comprising a horizontally inclined cross-sectionally substantially semi-circular mixing trough, a rotatable shaft in said trough, spokes on said shaft, a helical blade carried by said spokes peripherally thereof, periodically recurring recesses formed on the inside and on the outside of said blade, means forming a feed chamber, means for supplying to said feed chamber materials to be intermixed, a conveyor screw in said feed chamber, means for rotating said shaft to rotate said conveyor screw in said feed chamber for moving material to the lower end of said trough and to rotate said helical blade in said trough so as to convey said material through said trough and to intermix said materials incident to such conveyance for discharge at the upper end of said trough, said conveyor screw in said feed chamber having a conveying capacity which is smaller than that of said blade in said mixing trough and related to the conveying capacity of said blade so that said mixing trough in the operation of said machine will be filled with material to a level disposed below said shaft.

8. The structure as defined in claim 7, wherein the interior opening of said blade is of elliptical form, the widest portion of said opening forming said recesses inside thereof.

9. The structure as defined in claim 7, wherein said conveyor screw has a feed capacity which increases in the direction of travel of the material, hopper means for said feed chamber for supplying materials thereto, and adjustable partition means for regulating the amount of material which is fed to predetermined portions of said conveyor screw in said feed chamber.

10. The structure as defined in claim 7, together with means forming a shield in said feed chamber for shielding a predetermined portion of said feed screw therein.

11. The structure as defined in claim 7, together with hopper means for said feed chamber for supplying material thereto, and separate hopper means for supplying material directly to said mixing trough at the lower end thereof.

PAUL AUGUST.

REFERENCES CITED

The following references are of record in the file of this patent:

UNITED STATES PATENTS

| Number | Name | Date |
| --- | --- | --- |
| 930,573 | Svenson | Aug. 10, 1909 |
| 1,119,634 | Pottorf | Dec. 1, 1914 |
| 1,499,790 | Sharp et al. | July 1, 1924 |
| 1,581,492 | Rybeck | Apr. 20, 1926 |
| 1,611,297 | Wickey | Dec. 21, 1926 |

FOREIGN PATENTS

| Number | Country | Date |
| --- | --- | --- |
| 608,276 | Great Britain | Sept. 13, 1948 |